(12) United States Patent
Haque et al.

(10) Patent No.: US 12,238,095 B2
(45) Date of Patent: *Feb. 25, 2025

(54) MUTUAL SECURE COMMUNICATIONS

(71) Applicant: Comcast Cable Communications, LLC, Philadelphia, PA (US)

(72) Inventors: Asad Haque, Chesterbrook, PA (US); Ahmad Douglas, Atlanta, GA (US); Ahmad Altamimi, Malvern, PA (US); Liesheng Long, Havertown, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/478,419

(22) Filed: Sep. 29, 2023

(65) Prior Publication Data

US 2024/0146725 A1 May 2, 2024

Related U.S. Application Data

(63) Continuation of application No. 17/883,162, filed on Aug. 8, 2022, now Pat. No. 11,824,853, which is a
(Continued)

(51) Int. Cl.
*H04L 9/40* (2022.01)
*H04L 9/32* (2006.01)

(52) U.S. Cl.
CPC .......... *H04L 63/0869* (2013.01); *H04L 9/321* (2013.01); *H04L 9/3247* (2013.01);
(Continued)

(58) Field of Classification Search
CPC ............. H04L 63/0442; H04L 63/0823; H04L 63/0869; H04L 63/108; H04L 63/123;
(Continued)

(56) References Cited

U.S. PATENT DOCUMENTS 9,923,923 B1 3/2018 Sharifi Mehr et al.
2006/0195689 A1 8/2006 Blecken et al.
(Continued)

FOREIGN PATENT DOCUMENTS

GB 245736 A 5/1926
WO 2016153423 A1 9/2016

OTHER PUBLICATIONS

Stallings, Cryptography and Network Security—Principles and Practice, 2011, Prentice Hall, 5th Edition, pp. 429-437 and 485-508.*

(Continued)

*Primary Examiner* — Minh Dinh
(74) *Attorney, Agent, or Firm* — Banner & Witcoff, Ltd.

(57) ABSTRACT

A sending device may send data intended for a target device. An intermediate device may intercept the data sent from the sending device and forward the communications to the target device. Security data (e.g., a security certificate for authentication) along with an encrypted version of the security data may be sent at the application layer such that it passes from the sending device, through the intermediate device, and to the target device without being analyzed or modified by the intermediate device. The target device may use the encrypted security data and the security data to verify the identity of the sending device.

38 Claims, 6 Drawing Sheets

Related U.S. Application Data continuation of application No. 16/376,162, filed on Apr. 5, 2019, now Pat. No. 11,457,010.

(52) U.S. Cl.
CPC .......... *H04L 9/3268* (2013.01); *H04L 9/3297* (2013.01); *H04L 63/0442* (2013.01); *H04L 63/0823* (2013.01); *H04L 63/166* (2013.01); *H04L 63/18* (2013.01)

(58) Field of Classification Search
CPC ..... H04L 63/166; H04L 63/168; H04L 63/18; H04L 2463/121; H04L 9/321; H04L 9/3247; H04L 9/3263; H04L 9/3268; H04L 9/3297
See application file for complete search history.

(56) References Cited

U.S. PATENT DOCUMENTS

| | | |
|---|---|---|
| 2007/0064673 A1 | 3/2007 | Bhandaru et al. |
| 2008/0282254 A1 | 11/2008 | Blander et al. |
| 2008/0301438 A1 | 12/2008 | Parkinson |
| 2009/0271613 A1 | 10/2009 | Brabson |
| 2010/0217975 A1 | 8/2010 | Grajek et al. |
| 2011/0047373 A1 | 2/2011 | Karasawa et al. |
| 2011/0154454 A1 | 6/2011 | Frelechoux |
| 2011/0252127 A1 | 10/2011 | Iyengar et al. |
| 2012/0036364 A1 | 2/2012 | Yoneda et al. |
| 2013/0145165 A1 | 6/2013 | Brown et al. |
| 2014/0020073 A1 | 1/2014 | Ronda et al. |
| 2014/0280595 A1 | 9/2014 | Mani et al. |
| 2016/0373412 A1 | 12/2016 | MacCarthaigh |
| 2017/0149571 A1 | 5/2017 | Sun |
| 2017/0279807 A1 | 9/2017 | Bermudez |
| 2020/0304476 A1* | 9/2020 | Moore ................ H04L 63/0272 |

OTHER PUBLICATIONS

Menezes et al., Handbook of Applied Cryptography, 2001, CRC Press, pp. 397-400.*
B. Smyth and A. Prionti, "Truncating TLS Connections to Violate Beliefs in Web Applications," INRIA Paris-Rocquencourt, Paris, France, 2013.

* cited by examiner

MUTUAL SECURE COMMUNICATIONS

CROSS REFERENCE TO RELATED APPLICATIONS

This application is a continuation of and claims priority to U.S. patent application Ser. No. 17/883,162, filed Aug. 8, 2022, which is a continuation of U.S. patent application Ser. No. 16/376,162, filed Apr. 5, 2019 (now U.S. Pat. No. 11,457,010), each of which is hereby incorporated by reference in its entirety.

BACKGROUND

Transport Layer Security (TLS) is a standard security protocol (RFC 5246) providing a cryptographic solution for a client (such as a web browser) to authenticate a server. TLS may establish an encrypted secure channel over which the client and server can exchange information. Typical security protocols, such as TLS, are designed to operate between a client and server as end points for a secure communications channel. However, there are situations in which a client communicates with an intermediate device, such as a gateway or load balancer, rather than directly with the server, and the intermediate device may present a vulnerability under the traditional TLS protocol, if the intermediate device were to tamper with security data being exchanged via TLS. These and other shortcomings are addressed by this disclosure.

SUMMARY

The following summary presents a simplified summary of certain features. The summary is not an extensive overview and is not intended to identify key or critical elements.

Systems, apparatuses, and methods are described that allows a sending device and target device to authenticate each other in the presence of an intermediate device. The intermediate device may receive incoming security protocol-related data and messages, perform intermediate-type authentication of a computing device, and/or establish a secure communication channel with the sending device. The intermediate device may receive incoming communications and route those communications to a variety of computing devices. The intermediate device may decrypt encrypted data sent by the sending device, and pass the unencrypted data to the target device. Security data (e.g., a security certificate for authentication) may be structured within the data sent by the sending device at an application layer such that it passes through the intermediate device without the security data being extracted or processed by the intermediate device. For example, a security protocol message sent from the sending device and to the target device may include two forms of an authentication certificate issued to the target device—one that is unencrypted, and another that is encrypted using a key associated with the target device. The intermediate device may use the unencrypted form for compatibility with security protocols, but the encrypted form may be inaccessible to the intermediate device, and may be passed on to the target device undisturbed, to allow the target device to determine whether the intermediate device has tampered with the security protocol messages or certificate. The target device can use the security data to authenticate the identity of the sending device outside of the secure communication channel without the intermediate device having access to and/or decoding the security data.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

The accompanying drawings, which form a part hereof, show examples of the disclosure. It is to be understood that the examples shown in the drawings and/or discussed herein are non-exclusive and that there are other examples of how the disclosure may be practiced.

Figure 1:
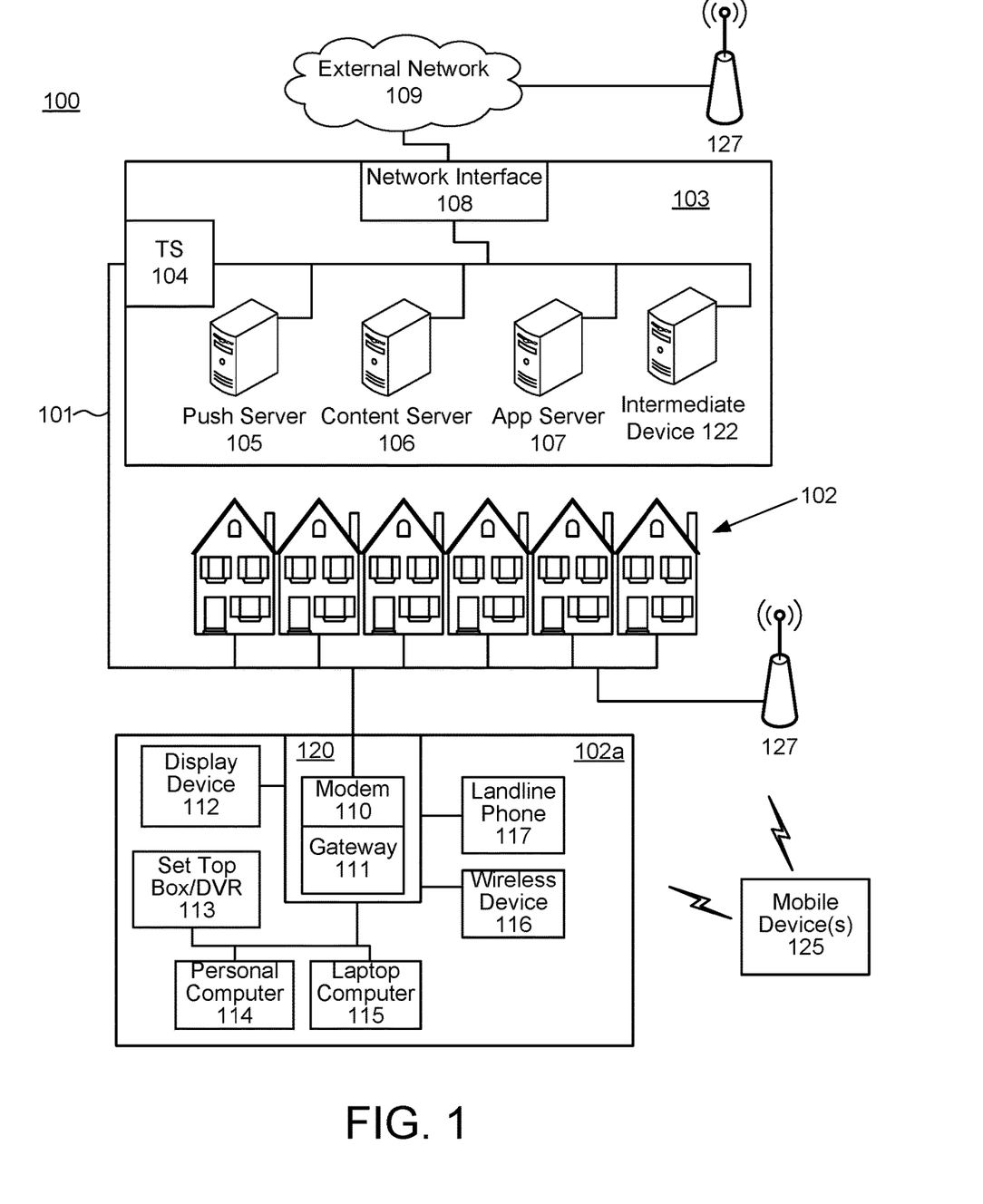
FIG. 1 shows an example communication network.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not illustrated, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104, such as a termination system (TS). The interface 104 may comprise a cable modem termination system (CMTS) and/or other computing device(s) configured to send information downstream to, and to receive information upstream from, devices communicating with the local office 103 via the communications links 101. The interface 104 may be configured to manage communications among those devices, to manage communications between those devices and backend devices such as servers 105-107 and 122, and/or to manage communications between those devices and one or more external networks 109. The local office 103 may comprise one or more network interfaces 108 that comprise circuitry needed to communicate via the external networks 109. The external networks 109 may comprise networks of Internet devices, telephone networks, wireless networks, wireless networks, fiber optic networks, and/or any other desired network. The local office 103 may also or alternatively communicate with the mobile devices 125 via the interface 108 and one or more of the external networks 109, e.g., via one or more of the wireless access points 127.

The intermediate device 122 may intercept incoming communications and process those communications to be forwarded to a variety of computing devices, such as push server 105, content server 106, app server 107, and other computing devices. The intermediate device 122 may receive communications between devices located in a local office 103 and devices outside the local office 103 communicating via communication links 101. The intermediate device 122 may terminate secure communication channels established over communication links 101, such as SSL and TLS connections. The intermediate device 122 may include any of a variety of devices, such as load balancers, internet gateways, network address translation (NAT) gateways, routes, and the like. The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, such as the intermediate device 122, additional push, content, and/or application servers, and/or other types of servers. Although shown separately, the push server 105, the content server 106, the application server 107, the intermediate device 122, and/or other server(s) may be combined. The servers 105, 106, 107, and 122, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g. Voice over Internet Protocol VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
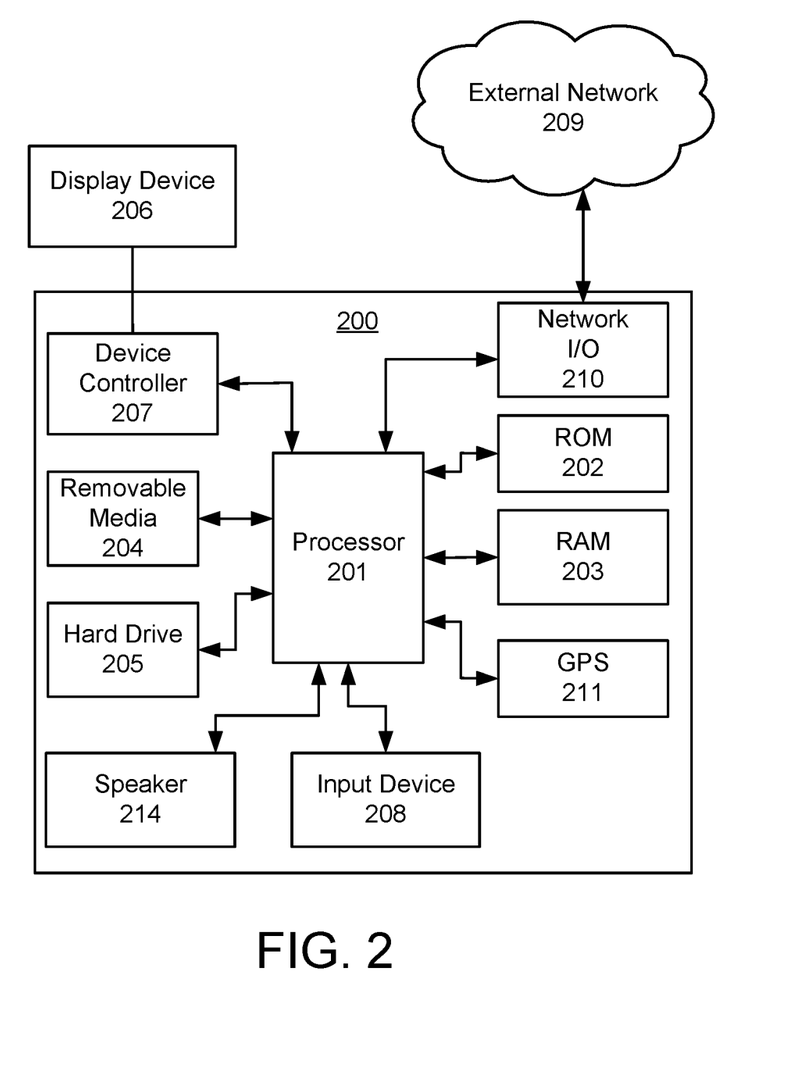
FIG. 2 shows hardware elements of a computing device.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109) and any other computing devices discussed herein. The computing device 200 may comprise one or more processors 201, which may execute instructions of a computer program to perform any of the functions described herein. The instructions may be stored in a read-only memory (ROM) 202, random access memory (RAM) 203, removable media 204 (e.g., a USB drive, a compact disk (CD), a digital versatile disk (DVD)), and/or in any other type of computer-readable medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Transport Layer Security (TLS) is a standard security protocol (RFC 5246) providing a cryptographic solution for a client (such as a web browser) to authenticate a target device. TLS may also include establishing an encrypted secure channel via which the sending device and target device can exchange information. Most implementations of TLS are referred to as 1-way TLS in which computing devices are authenticated using a certificate during a handshaking procedure. It should be noted that TLS is provided as an example only and that any security protocol (or combination of protocols) may be used as appropriate. Computing devices may be authenticated via any authentication mechanism, such as a user ID and password. A sending device attempting to access a target device via a security protocol may directly communicate with an intermediate device, such as a gateway or load balancer, rather than with the target device directly. This intermediate device may serve as the endpoint for the communications being received from the sending device and may forward the received communications to the target device via a separate communication channel. This termination of the secured communication (e.g. TLS termination) may include handling incoming secured connections, decrypting the secured data, and passing on the unencrypted request to the target device as it may be assumed that the connection between the intermediate device and the target device is secure. That is, security measures, undertaken by computing devices to secure communications between the computing device and a target device, may only extend to an intermediate device rather than the target device. The computing device relies on the intermediate device to ensure that communications between the computing device and the target device are secure. However, a sending device may distrust the connection between an intermediate device and a target device is secure. Additionally, the sending device may distrust the intermediate device as the intermediate device may be able to read and/or modify the data intended for the target device.

Many devices in machine-to-machine systems, such as internet-of-things (IOT) devices, encounter issues when handshaking information to establish a secure communication channel is intercepted by intermediate devices (e.g. TLS termination), such as load balancers, gateway devices, and other high availability infrastructure. The devices and the target device, which are communicating data with each other, are therefore unable to complete the handshake process as the target device does not participate in security authentication and relies on information received from the intermediate device. Accordingly, the data is not transmitted by a known secure communication channel from endpoint to endpoint, resulting in communications that are not guaranteed to be secure from endpoint to endpoint. In order to verify the security of the communication channel from the sending device to the target device, security data (e.g., a security certificate for authentication) may be structured at the application layer such that it passes through the intermediate device and from the sending device and/or target device without the security data being extracted or processed at the intermediate device. The security data may be encoded and presented at an application layer rather than at a link layer (typically used by tunneling applications) as in the Internet protocol suite. For example, a sending device may send secured data to a cloud service such that the secured data passes through a gateway and to a destination application behind the gateway.

Figure 3:
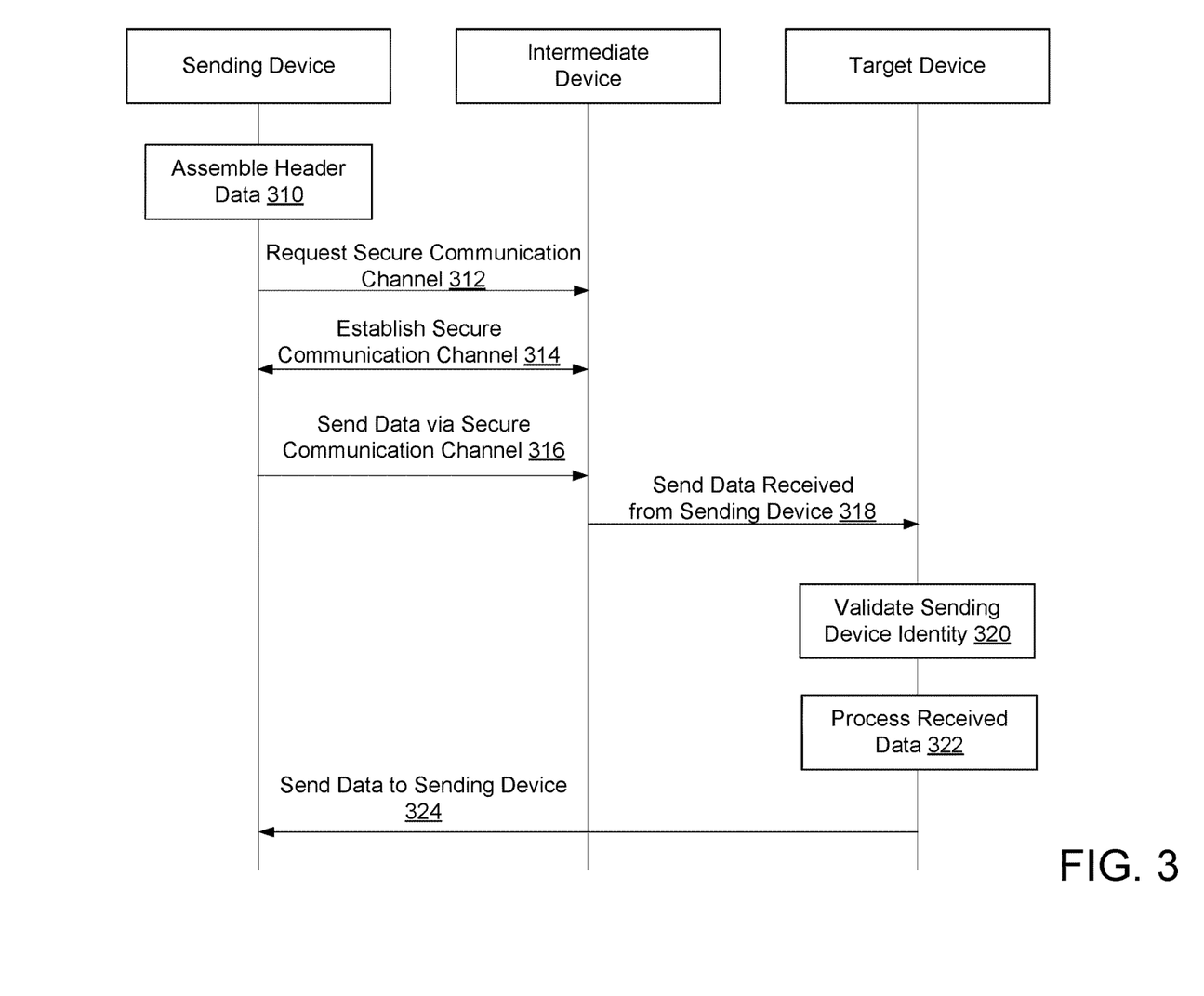
FIG. 3 is a signaling diagram showing an example of authentication.

FIG. 3 is a diagram showing an example authentication process. At step 310, data may be assembled by a sending device. The data may specify the highest security protocol version it supports, a random number, a list of suggested cipher suites, and/or compression methods. As described in more detail with respect to FIG. 5, the message may include an encoded copy of the sending device's public key certificate. The sending device may be any computing device that transmits data intended for the target device. For example, the sending device may be a device managed by a first content provider, and the intermediate device and/or target device may be managed by a second content provider. In this example, the sending device may wish to transmit data associated with the first content provider to the target device without exposing the data to the second content provider as the data passes through the intermediate device. For example, a first service provider may manage both the sending device and the target device and a second service provider may manage the intermediate device. The first service provider may wish to transmit data from the sending device to the target device without exposing the transmitted data to the second service provider as the data passes through the intermediate device. For example, sending devices may generate and/or send a variety of data regarding an environment to a central server for processing and analysis, such as in smart home applications for reducing energy usage and/or monitoring occupant behaviors. For example, sending devices can be used for remote health monitoring and emergency notification systems. Health monitoring devices may include blood pressure monitors, heart rate monitors, activity trackers, pacemakers, hearing aids, or any other device monitoring and/or controlling the health of an individual. Data generated from these devices may be sent to a target device at a hospital, insurance company, and/or any other treatment facility to monitor the health and wellbeing of a patient in a secure manner.

At step 312, a secure communication channel may be requested. The secure communication channel may be a security request (such as a TLS request) for the target device. The request may include the data assembled by the sending device. The intermediate device may prepare a message indicating the chosen protocol version, a random number, cipher suite, a compression method from the choices offered by the sending device, a session identifier, and/or a public key associated with the intermediate device and/or a public key associated with the target device. The chosen protocol version may be the highest security protocol version that both the sending device and intermediate device support. The secure communication channel may be requested so that data transmitted between the sending device and the target device is secured from analysis or modification by third parties. For example, a first content provider may secure communications between a sending device managed by the first content provider and a target device managed by the second content provider so that the communications between the sending device and the target device cannot be analyzed or modified by the second content provider. For example, a sending device and a target device, both managed by a first service provider, may secure communications between the sending device and the target device so that a second service provider, which may manage an intermediate device routing communications between the sending device and the target device, cannot analyze or modify the communications sent between the sending device and the target device. For example, a smart thermostat may request a secured communication channel with a central server for transmitting temperature data over a particular time period. For example, a health monitoring device may request a secure communication channel with a target device at a hospital so that a doctor can monitor the vital signs of a patient.

At step 314, the intermediate device may establish a secure communication channel between the intermediate device and the sending device. The intermediate device may transmit the prepared message to the sending device. The sending device may respond with a message indicating the public key of the sending device and encrypted using the public key of the intermediate device and/or the target device. The sending device and intermediate device may compute a common encryption key that may be used to encrypt communications between the sending device and the intermediate device. The public keys and/or common encryption key may be used to establish a secure communication channel between the sending device and the intermediate device. The secure communication channel may include a Hypertext Transfer Protocol (HTTP) or HTTP Secure (HTTPS) session. The protocol version used in a HTTPS session may correspond to the chosen protocol version established in the message prepared by the intermediate device. The secure communication channel may be encrypted using the public key associated with the sending device, intermediate device, and/or target device. The secure communication channel may be encrypted using the common encryption key. For example, an intermediate device managed by a second content provider may act as a gateway for communications sent to a target device managed by the second content provider. The intermediate device may intercept communications intended for the target device. For example, an intermediate device managed by a second service provider may provide a routing service for communications between one or more sending devices and a target device provided by a first service provider. The intermediate device may route communications from a variety of sending devices to the target device via a dedicated, secured communication channel between the intermediate device and the target device. For example, a smart thermostat may establish a secure communication channel with a load balancer used by a central server system for monitoring the environmental conditions across multiple homes. For example, a health monitoring devices may establish a secure communication channel with a gateway device that secures data stored by the target device from access by devices outside of the hospital.

At step 316, the sending device may send data to the intermediate device via the secure communication channel. The data sent by the sending device may be intended for the target device. The intermediate device may serve as the endpoint of the secure communication channel intended between the sending device and the target device (e.g. TLS termination). The data sent by the sending device include a header and a body. As described in more detail with respect to FIG. 5, the header may include a variety of data, including a copy of the sending device's public key certificate. The body may include an encoded copy of the sending device's public key certificate and/or any data, such as data generated by an IoT device, to be sent to the target device. For example, the header and/or body may be encrypted by a sending device managed by a first content provider and sent to a target device managed by a second content provider so that an intermediate device provided by the second content provider cannot analyze or modify the encrypted data. For example, the header and/or body may be encrypted by a sending device managed by a first service provider and sent to a target device managed by the first service provider so that an intermediate device managed by a second service provider cannot decode the encrypted data. For example, a smart thermostat may send data packets including the temperature data intended for a central server to a load balancer. For example, a health monitoring device may send private health data, intended for a doctor's computer, that is received by a gateway device.

The intermediate device may send, at step 318, the data provided by the sending device to the target device. For example, the intermediate device may provide a gateway service and route incoming communications to a variety of computing devices such as the target device. For example, the encrypted data in the header and/or body may be sent by the intermediate device managed by a second content provider to the target device managed by the second content provider so that the intermediate device cannot analyze or modify the encrypted data sent by the first content provider. For example, the encrypted data in the header and/or body may be sent by an intermediate device managed by a second service provider to a target device managed by a first service provider so that the intermediate device cannot process the encrypted data sent by the target device. The intermediate device may decode the data provided by the sending device without modifying the header and/or body of the data sent by the sending device. For example, a portion of the header and/or body may be encrypted using a public key provided by the target device and/or a private key used by the sending device such that the encrypted portion of the header and/or body cannot be readily viewed or processed by the intermediate device. The intermediate device may decode the data using the public key associated with the sending device, intermediate device, and/or target device. The intermediate device may decode the data using a common encryption key. The data sent by the intermediate device to the target device may be sent via a second communication channel distinct from the secure communication channel established by the sending device and intermediate device. For example, the target device may store data captured by a variety of IoT device and the intermediate device may be a load balancing proxy handling requests to upload captured data. The load balancing proxy and the target device may have a previously established second communication channel between them. The second communication channel may be unsecured. The second communication channel may be secured using self-signed certificates issued by the target device and/or intermediate device. For example, a load balancer may select a target device from a plurality of target devices providing a distributed central server and transmit the received data to the selected target device. For example, a gateway may forward incoming data to a target device associated with a patient's doctor without exposing the target device to any public networks, such as the Internet.

At step 320, the identity of the transmitting device (or any other sending device) may be validated by the target device. The target device may reassemble the data sent by the sending device. The data may be encoded and the target device may decode the encoded request data. Certificate data may be extracted, by the target device, from the decoded request data. The certificate data may be decoded using a public key associated with the sending device. The certificate data may be validated by a validation system and/or by a public key provided by the sending device. The validation of the certificate data may include verifying the certificate is not expired and/or the certificate was issued by a trusted validation system. The target device may validate signature data based on the verified certificate. The target device may validate the identity of the sending device by providing the sending device's public key certificate to a validation system. Specific validation techniques are described in more detail with respect to FIG. 6. For example, a smart thermostat may encode temperature data using a certificate associated with the smart thermostat and a central server and the central server can verify the identity of the smart thermostat using the certificate. For example, a doctor's computer can validate that health data received from a patient's health monitoring device was generated by the health monitoring device.

At step 322, the received data may be processed by the target device. Any of a variety of data may be received and processed by the target device. For example, a target device may receive data regarding an environment from a smart thermostat installed in a user's home. For example, a target device may receive health information from a variety of health monitoring devices, such as blood pressure monitors, heart rate monitors, activity trackers, pacemakers, hearing aids, or any other device monitoring and/or controlling the health of an individual. A target device at a hospital, insurance company, and/or any other treatment facility may monitor the health and wellbeing of a patient in a secure manner based on the received data. For example, sending devices may include location-tracking capabilities and be attached to any of a variety of vehicles, cargo, and other vehicular infrastructure devices. These devices may capture data describing the location and/or operation of a variety of vehicles and other objects and be provided to a target device in a secure manner. The target device may process the vehicular data for smart traffic control, electronic toll systems, vehicle telematics, fleet management, vehicle control, and/or providing roadside assistance.

At step 324, the target device may send data to the sending device. The data may be sent directly from the target device to the sending device. The target device may provide the data to the intermediate device and the data may be sent to the sending device via the secure communication channel provided between the intermediate device and the sending device. The data sent by the target device may be based on the data sent by the sending device. For example, the target device may determine a thermostat setting and transmit the thermostat setting to a smart thermostat based on energy usage and temperature data provided by the smart thermostat. For example, the target device may transmit a notification message to an activity tracker indicating that a blood pressure measurement provided by the activity tracker exceeds a threshold value determined by the target device. For example, the target device may transmit routing data to a vehicle telematics device when the target device determines that the location of a vehicle telematics device has deviated from a route previously provided to the vehicle telematics device.

Figure 4:
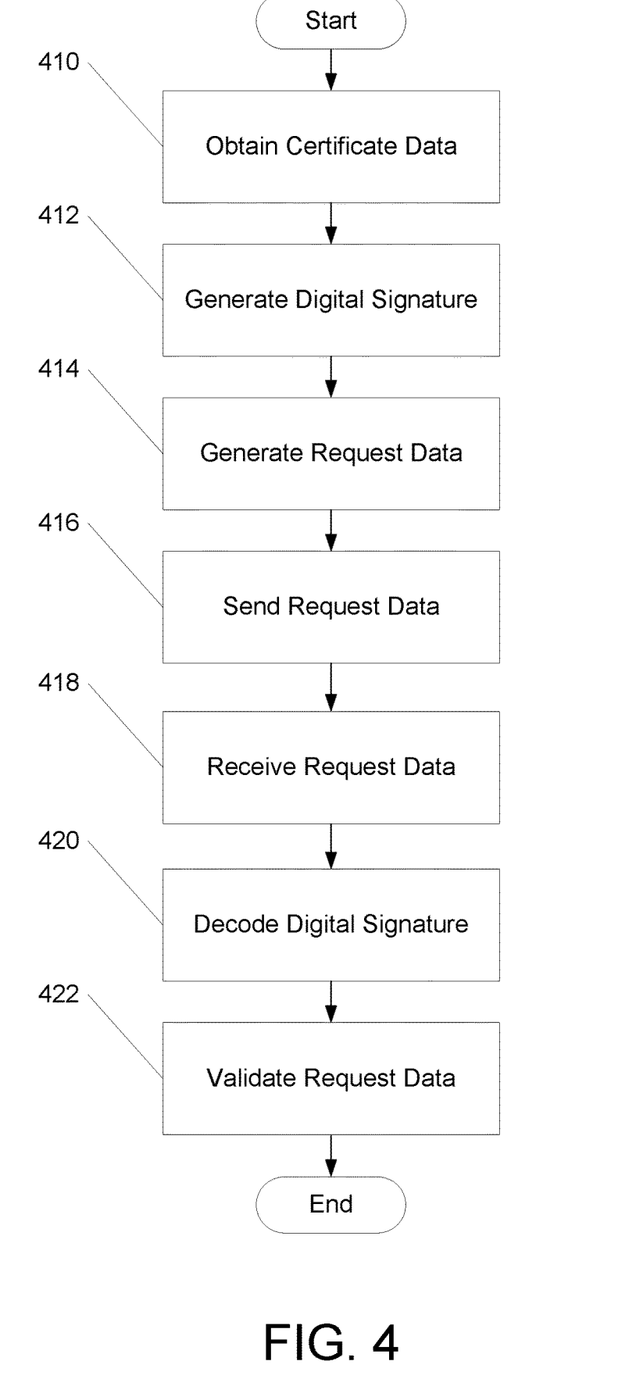
FIG. 4 is a flow chart showing an example method for authentication.

A sending device may format data to be sent, via a secure communication channel, to a target device such that security information, such as the sending device's public key certificate, will be provided to a target device even in the event of an intermediate device terminating the secure communication channel. FIG. 4 is a flow chart showing an example method for authentication, such as TLS authentication. Some or all of the steps described with respect to FIG. 4 may be performed by a sending device, a target device, and/or any other computing device.

Certificate data may be received (410). Computing devices may utilize public certificates to validate the sending device and/or target device. Each device has their own public certificate and may authenticate other devices via a handshaking procedure. These certificates may utilize a public key infrastructure (PKI) in which a certificate authority, or other computing device, issues certificates to particular devices and validates a provided certificate. The validation system may provide a public key associated with a sending device that may be retrieved when validating a certificate. In this way, the validation system may validate that data signed with the certificate for a particular system originated from the particular system. However, distributed authentication systems (such as OpenPGP) may also be utilized to verify the authenticity of a certificate. Many certificates are formatted using the X.509 standard. The certificate data may include a X.509 certificate. However, any digital certificate or digital signature generated using any cryptosystem, such as RSA, DSS, elliptical curves, and YAK, may be utilized. The certificate data may be provided by a validation system.

A digital signature may be generated (412). The digital signature may be generated by a sending device. The digital signature may be generated based on the sending device's public key. The digital signature may be generated using a Base64 encoding. However, any encoding, such as MIME and yEnc, may also be utilized. The digital signature may also include a signature for the sending device. The signature of the sending device may be generated based on any of a variety of hardware and/or software aspects of the sending device. Hardware and/or software aspects of the sending device may include, but are not limited to, a media access control address, IP address, installed processor(s), memory, operating system, and/or installed software. The signature may be generated using any of a variety of cryptographic hash functions, such as SHA-2.

Request data may be generated (414). The request data may include the encoded digital signature as described in more detail with respect to FIG. 5. The request data may include a header and/or a body. The request data may be a message formatted using HTTP. The request data may be a HTTP request and/or a HTTP response. The header may include a variety of data, including the encoded digital signature. The body may include the encoded digital signature. and/or any data, such as data generated by an IoT device, to be sent to the target device. For example, a smart home device may generate data describing the time a HVAC system is in operation. For example, a health monitoring device may generate data describing a patient's heartbeat. For example, a vehicle telematics device may generate data regarding the location of the vehicle telematics device and the speed at which the vehicle telematics device is moving.

Request data may be sent (416). The request data may be sent, by the sending device and via a communication channel, and intended for a target device. The request data may be intercepted by an intermediate device that forwards the header data to the target device. The communication channel may be secured between the sending device and an intermediate device. Data sent via the secure communication channel may be encrypted using a public key associated with the sending device, intermediate device, and/or target device. The secure communication channel may be encrypted using a common encryption key negotiated between the sending device and the intermediate device. The request data may include the encoded data in the header. The header may be a HTTP and/or HTTPS header. For example, a smart home device may send data to a central server which provides the data to a homeowner's mobile device. For example, a health monitoring device may send data to a hospital server system so that the patient's doctor can keep track of the patient's condition. For example, a vehicle telematics device may send location to a fleet tracking system which tracks the location of a fleet of vehicles.

Request data may be received (418). The request data may be received by a target device and from an intermediate device. The intermediate device may decrypt the request data using the security data for the secure communication channel between the sending device and the intermediate device. The intermediate device may decode the data using the public key associated with the sending device, intermediate device, and/or target device and/or the common encryption key. The data sent by the intermediate device to the target device may be sent via a second communication channel distinct from the secure communication channel established by the sending device and intermediate device. The second communication channel may be unsecured. The second communication channel may be secured using self-signed certificates issued by the target device and/or intermediate device.

A digital signature may be decoded (420). The target device may decode the request data to receive the digital signature for the sending device originally sending the request data. The digital signature may be decoded by the target device as described in more detail with respect to FIG. 6.

Request data may be validated (422). The validation of the request data may be based on a request provided by the target device to a validation system. The target device may validate the identity of the originator of the request data using the digital signature. The request data may be validated based on certificate data validated by the validation system that provided the certificate data associated with the sending device.

Figure 5:
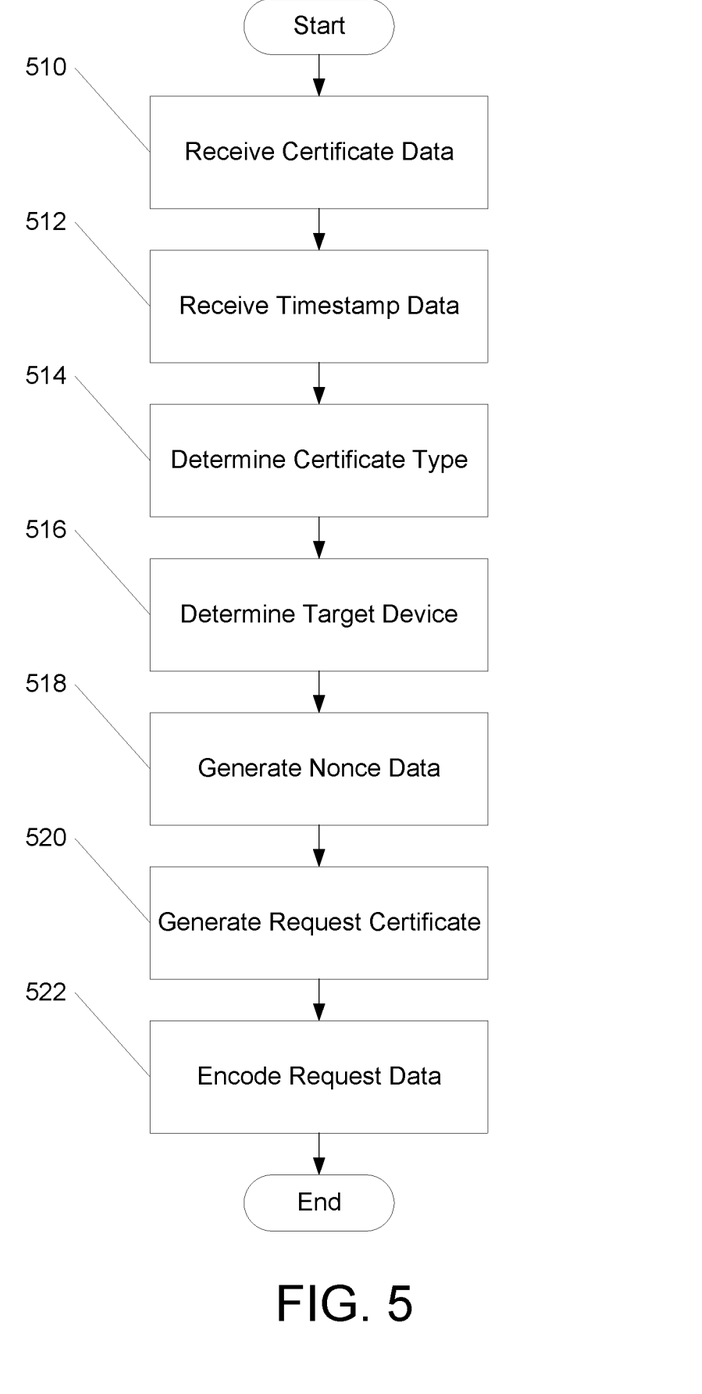
FIG. 5 is a flow chart showing an example method for encoding data.

FIG. 5 is a flow chart showing an example method for encoding data. Some or all of the steps described with respect to FIG. 5 may be performed by a sending device and/or any other computing device.

Certificate data may be received (510). The certificate data may be generated by the sending device. The certificate data may be generated by a validation system for the sending device. The certificate data may include a public key infrastructure (PKI) certificate. The validation system may be provided by a certificate authority that issues certificates to particular devices and validates a provided certificate. A certificate authority may be a neutral, trusted third party that is trusted by both the sending device and the target device. The certificate may be a root certificate and/or an intermediate certificate. A root certificate may be utilized by a computing device to issue an intermediate certificate.

Timestamp data may be received (512). The timestamp may indicate the time the request was generated. The timestamp may be generated using the internal clock of the sending device. The timestamp may be received from a time service, such as a network time protocol server. The timestamp may be based on a message indicating a time received by the sending device and from the intermediate device and/or the target device.

A type of the certificate may be determined (514). The certificate type may be determined by comparing the format of the digital certificate to known certificate formats. The certificate type may be indicated by metadata associated with the certificate. The certificate type may be indicated by the header of the request. The certificate data may include a X.509 certificate. However, any digital certificate or digital signature generated using any cryptosystem, such as RSA, DSS, elliptical curves, and YAK, may be utilized. The certificate data may be provided by a validation system. Distributed authentication systems (such as OpenPGP) may also be utilized to verify the authenticity of a certificate.

A target device may be determined (516). The target device may be identified by an IP address, domain name, or any other identifier. The identity of the target device may be pre-coded on the sending device. For example, the sending device may be programmed with the URL of a target device that stores data being captured by the sending device. However, any identification, such as an IP address, may be used to identify the target device. The identity of the target device may be based on the data being sent to the target device. For example, the sending device may capture two distinct types of data, with the first type of data being sent to a first target device and a second type of data being sent to a second target device.

Nonce data may be generated (518). The nonce data may include any random or pseudo-random number. The nonce data may be generated by the sending device. The nonce may be valid for a single use. The nonce data may include a timestamp and/or may be time-variant. The nonce data may be generated with a sufficient length as to be probabilistically unlikely to repeat a previously generated nonce value.

A request certificate may be generated (520). The request certificate may include the certificate data, the timestamp, the target device, an indication of the certificate type, and/or the nonce. The following is an example data structure for the request certificate:

```
"certificateRequestToken": {
    "certificate": "<certificate data>",
    "timestamp": 1503687297540,
    "type": "x509"
    "target": "server.host.com"
    "nonce": "1JNiy1Zc9to7BwDRfR"
}
```

Request data may be encoded (522). The request data may include the request token and a digital signature. The digital signature may be encoded by concatenating the raw byte values of the request certificate and encoding the concatenated byte values. The digital signature may be encoded using any of a variety of digital signatures, such as a private key on the sending device. The following is an example data structure for the request data:

```
"certificateRequestToken": {
    "certificate": "<certificate data>",
    "timestamp": 1503687297540,
    "type": "x509"
    "target": "server.host.com"
    "nonce": "1JNiy1Zc9to7BwDRfR"
    "signature": "<digital signature>"
}
```

The request data may be included in data to be sent from a sending device to the target device. The data to be sent may include a header and/or a body. The request data may be included in the header and/or the body. The request data may be encoded using any appropriate encoding scheme based on the communication channel, such as by computing a Base64 string. The following is an example of a header having encoded request data:

```
POST https://www.host.com/preferenceDataService/
Connection: keep-alive
Accept: application/json
Content-Type: application/json
User-Agent: YourUserAgent
X-PartnerId: cox
Authorization: Bearer <encoded request data>
```

Figure 6:
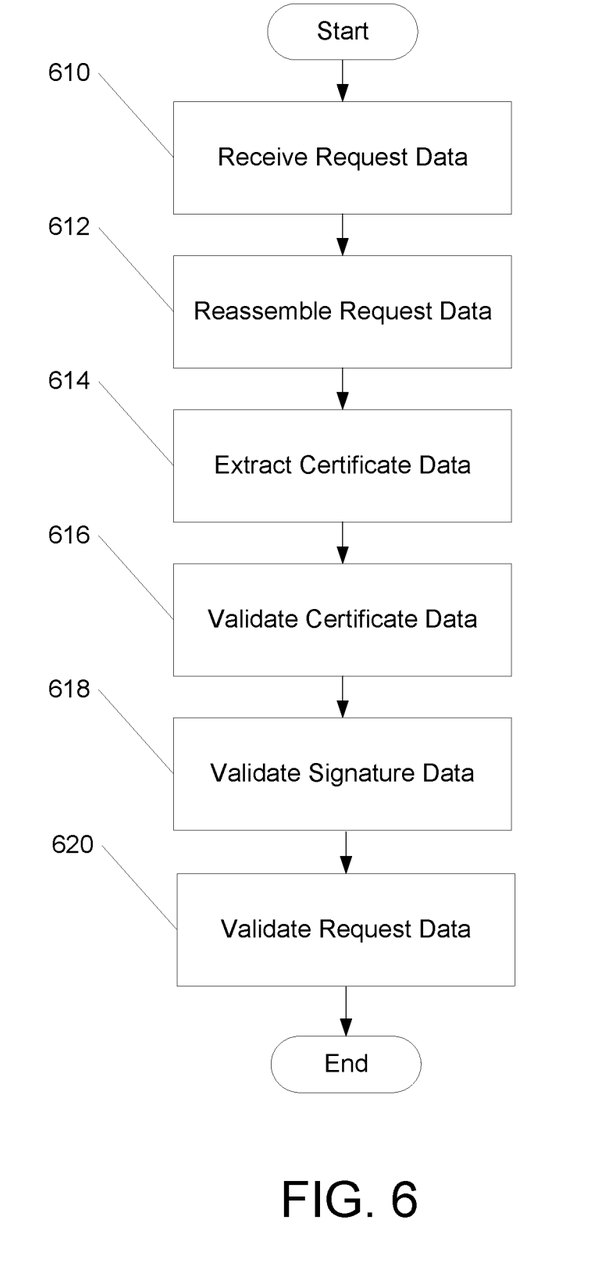
FIG. 6 is a flow chart showing an example method for decoding data.

A target device may receive request data, decode the received request data, and confirm the identity of a sending device sending the request data using a digital signature in the received request data. FIG. 6 is a flow chart showing an example method for decoding data. Some or all of the steps described with respect to FIG. 6 may be performed by a target device and/or any other computing device.

Request data may be received (610). The request data may be sent by and received from an intermediate device. The request data may originate from a sending device. The request data may be encoded using security data for a communication channel between the intermediate device and the target device. The request data may be decoded using the security information for the communication channel between the intermediate device and the target device. The request data may include a header and/or a body. The header and/or body may include the encoded digital signature and/or any data, such as data generated by an IoT device, to be sent to the target device.

Request data may be reassembled (612). As sent by the sending device, the request data may be encoded using any of a variety of encoding formats, such as Base64, MIME, and/or yENC. Reassembling the request data may include decoding the encoded request data. Reassembling the request data may include performing a Base64 decode on the request data. However, any decoding may be performed on the request data, such as a MIME decode and/or a yEnc decode. The request data may be reassembled in order to convert the request data from a byte string into a plain text format. For example, the reassembly of the request data may include performing a Base64 decode on a byte string to generate a HTTP request message (and/or a HTTP response message) which may be decoded by a web server.

Certificate data may be extracted (614). The certificate data may be extracted from the reassembled request data. The certificate data may be extracted from a header and/or a body in the reassembled request data. For example, the certificate data may be extracted from a HTTP header in the reassembled request data. Extracting the certificate data may include decoding the certificate data. The certificate data may be decoded using a public key associated with the sending device. The sending device may provide the public key. A target device may receive the public key from a validation system such as a certificate authority. The public key may be utilized to decode data encoded by a sending device to verify that the data was sent by the sending device.

Certificate data may be validated (616). The certificate data may be validated by a validation system. The certificate data may be validated by a public key provided by the sending device. The validation of the certificate data may include verifying the certificate is valid. The validation of the certificate data may include verifying the certificate was issued by a trusted validation system. The validation of the certificate data may include verifying that the type of certificate identified in the request data matches the type of certificate extracted from the request data. For example, if the header of the request data identifies the certificate as a X.509 certificate, the extracted certificate may only be valid if the extracted certificate is a X.509 certificate.

Signature data may be validated (618). The signature data may be validated to confirm the device encoding the signature data corresponds to the device sending the data. The signature data may be validated using a public key provided by the validation system. The signature data may be validated using a public key provided by the sending device. The signature data may be validated using the certificate data once it has been validated. The signature data may be validated by a public key contained in the certificate data. The signature data may be validated using a signature generated based on the hardware and/or software configuration of the sending device. The signature may be validated by decoding the signature data and comparing the signature data to the request data with the signature removed. For example, the decoded signature data may correspond to the request data without the header such that an identical header should be decoded from the signature data. In this way, it may be confirmed that the computing device generating the request data also generated the signature. This comparison may be done in any of a variety of ways, such as character-by-character, field-by-field, etc. For example, the decoded header and the header in the request data may each be interpreted as a string of characters and the comparison may be done by comparing each character in the decoded header string to each character in the request header string. For example, each field in the decoded header (certificate, timestamp, type, target, nonce, and/or etc.) may be compared to the corresponding field in the header of the request data.

The request data may be validated (620). The request data may be validated by comparing a timestamp in the request data to the time at which the request data was received. The receipt time may be determined based on a current time maintained by the target device. If the request data was received outside a threshold period of time, the request data may be considered invalid. In this way, the target device can ensure that previously valid request data provided by the sending device is not being replayed by a malicious actor. The request data may be validated by verifying the integrity of the nonce value. The integrity of the nonce value may be determined by comparing the nonce value to a database of nonce values previously received by the target device and/or from the sending device. If the nonce value has been previously received by the target device from the sending device (either at any time in the past or within a threshold period of time, such as five minutes), the request data may be considered to be invalid. In this way, the target device can ensure that previously valid request data provided by the sending device has not been modified by a malicious actor.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   determining, by a first device, a second device for receipt of data;
   generating, by the first device, request data comprising:
      certificate data; and
      an encrypted version of the certificate data;
   sending, by the first device via an intermediate device and to the second device, the request data, wherein the intermediate device is blocked from decrypting the encrypted version of the certificate data included in the request data; and
   establishing, based on the certificate data included in the request data, a secure communication channel between the first device and the intermediate device.

2. The method of claim 1, wherein the generating the request data further comprises:
   generating a nonce;
   generating a timestamp;
   generating an indication of a type of the certificate data; and
   including the nonce, the timestamp, and the indication of the type in the request data.

3. A method comprising:
   determining, by a first device, a second device for receipt of data;
   generating, by the first device, request data comprising:
      certificate data; and
      an encrypted version of the certificate data;
   encrypting the request data using a private key associated with the first device;
   sending, by the first device via an intermediate device and to the second device, the request data; and
   establishing, based on the certificate data included in the request data, a secure communication channel between the first device and the intermediate device.

4. The method of claim 3, wherein the request data is included in a header of a message.

5. The method of claim 3, further comprising receiving, by the first device and from a certificate authority, the certificate data.

6. The method of claim 3, further comprising encoding, by the first device and using a Base64 encoding, the request data.

7. The method of claim 3, wherein the establishing, based on the request data, the secure communication channel further comprises:
   sending, to the intermediate device, a request message; and
   receiving, from the intermediate device, a response message.

8. The method of claim 3, wherein the establishing, based on the request data, the secure communication channel further comprises:
   receiving, by the first device and from the intermediate device, a message indicating at least one of:
      a chosen protocol version,
      a random number,
      cipher suite,
      a compression method,
      a session identifier,
      a public key associated with the intermediate device, or
      the public key associated with the second device.

9. A method comprising:
   determining, by a first device, a second device for receipt of data;
   generating, by the first device, request data comprising:
      certificate data; and
      an encrypted version of the certificate data;
   sending, by the first device via an intermediate device and to the second device, the request data;
   establishing, based on the certificate data included in the request data, a secure communication channel between the first device and the intermediate device; and
   sending, by the first device, to the second device, and via the intermediate device, data that is encrypted by the first device, wherein the first device and the second device are managed by a first service provider, and the intermediate device is managed by a second service provider.

10. The method of claim 9, further comprising determining, by the first device, the certificate data associated with the first device.

11. A method comprising:
    determining, by a first device, a second device for receipt of data;
    encrypting certificate data, using a public key associated with the second device, to generate an encrypted version of the certificate data;
    generating, by the first device, request data comprising:
       the certificate data; and
       the encrypted version of the certificate data;
    sending, by the first device via an intermediate device and to the second device, the request data; and
    establishing, based on the certificate data included in the request data, a secure communication channel between the first device and the intermediate device.

12. A method comprising:
    receiving, by a second device and from an intermediate device, request data comprising:

certificate data; and
an encrypted version of the certificate data;
decrypting the encrypted version of the certificate data using a private key associated with the second device to obtain decrypted certificate data;
validating the request data based on the decrypted certificate data and the certificate data; and
verifying an identity of a first device based on the certificate data.

13. The method of claim 12, wherein the intermediate device is blocked from decrypting the encrypted version of the certificate data included in the request data.

14. The method of claim 12, further comprising decrypting the request data using a public key associated with the first device.

15. The method of claim 12, further comprising decoding, by the second device and using a Base64 decoding, the request data.

16. The method of claim 12, wherein the validating the request data further comprises:
comparing, by the second device, a timestamp indicated in the request data to a current time maintained by the second device; and
validating the request data based on the current time being within a threshold period of the timestamp.

17. The method of claim 12, wherein the validating the request data further comprises:
comparing, by the second device:
a nonce value indicated in the request data; and
a database of previously received nonce values.

18. The method of claim 12, wherein the verifying the identity of the first device further comprises:
sending, to a certificate authority, the certificate data; and
receiving, from the certificate authority, validated certificate data.

19. The method of claim 18, wherein the validating the request data further comprises:
decoding a digital signature based on the validated certificate data.

20. A first device comprising:
one or more processors; and
memory storing instructions, when executed by the one or more processors, cause the first device to:
determine a second device for receipt of data;
generate request data comprising:
certificate data; and
an encrypted version of the certificate data;
send, via an intermediate device and to the second device, the request data, wherein the intermediate device is blocked from decrypting the encrypted version of the certificate data included in the request; and
establish, based on the certificate data included in the request data, a secure communication channel between the first device and the intermediate device.

21. The first device of claim 20, wherein the instructions, when executed by the one or more processors, further cause the first device to:
generate a nonce;
generate a timestamp;
generate an indication of a type of the certificate data; and
include the nonce, the timestamp, and the indication of the type in the request data.

22. A first device comprising:
one or more processors; and
memory storing instructions, when executed by the one or more processors, cause the first device to:
determine a second device for receipt of data;
generate request data comprising:
certificate data; and
an encrypted version of the certificate data;
encrypt the request data using a private key associated with the first device;
send, via an intermediate device and to the second device, the request data; and
establish, based on the certificate data included in the request data, a secure communication channel between the first device and the intermediate device.

23. The first device of claim 22, wherein the request data is included in a header of a message.

24. The first device of claim 22, wherein the instructions, when executed by the one or more processors, further cause the first device to receive, by the first device and from a certificate authority, the certificate data.

25. The first device of claim 22, wherein the instructions, when executed by the one or more processors, further cause the first device to encode, by the first device and using a Base64 encoding, the request data.

26. The first device of claim 22, wherein the instructions, when executed by the one or more processors, cause the first device to establish, based on the request data, the secure communication channel by:
sending, to the intermediate device, a request message; and
receiving, from the intermediate device, a response message.

27. The first device of claim 22, wherein the instructions, when executed by the one or more processors, cause the first device to establish, based on the request data, the secure communication channel by receiving a message from the intermediate device, the message indicating at least one of:
a chosen protocol version,
a random number,
cipher suite,
a compression method,
a session identifier,
a public key associated with the intermediate device, or
the public key associated with the second device.

28. A first device comprising:
one or more processors; and
memory storing instructions, when executed by the one or more processors, cause the first device to:
determine a second device for receipt of data;
generate request data comprising:
certificate data; and
an encrypted version of the certificate data;
send, via an intermediate device and to the second device, the request data;
establish, based on the certificate data included in the request data, a secure communication channel between the first device and the intermediate device; and
send, to the second device and via the intermediate device, data that is encrypted by the first device, wherein the first device and the second device are managed by a first service provider, and the intermediate device is managed by a second service provider.

29. The first device of claim 28, wherein the instructions, when executed by the one or more processors, further cause the first device to determine the certificate data associated with the first device.

30. A first device comprising:
one or more processors; and memory storing instructions, when executed by the one or more processors, cause the first device to:
    determine a second device for receipt of data;
    encrypt certificate data, using a public key associated with the second device, to generate an encrypted version of the certificate data;
    generate request data comprising:
        the certificate data; and
        the encrypted version of the certificate data;
    send, via an intermediate device and to the second device, the request data; and
    establish, based on the certificate data included in the request data, a secure communication channel between the first device and the intermediate device.

31. A second device comprising:
one or more processors; and
memory storing instructions, when executed by the one or more processors, cause the second device to:
    receive, from an intermediate device, request data comprising:
        certificate data; and
        an encrypted version of the certificate data;
    decrypt the encrypted version of the certificate data using a private key associated with the second device to obtain decrypted certificate data;
    validate the request data based on the decrypted certificate data and the certificate data; and
    verify an identity of a first device based on the certificate data.

32. The second device of claim 31, wherein the intermediate device is blocked from decrypting the encrypted version of the certificate data included in the request data.

33. The second device of claim 31, wherein the instructions, when executed by the one or more processors, further cause the second device to decrypt the request data using a public key associated with the first device.

34. The second device of claim 31, wherein the instructions, when executed by the one or more processors, further cause the second device to decode, using a Base64 decoding, the request data.

35. The second device of claim 31, wherein the instructions, when executed by the one or more processors, cause the second device to validate the request data by:
    comparing a timestamp indicated in the request data to a current time maintained by the second device; and
    validating the request data based on the current time being within a threshold period of the timestamp.

36. The second device of claim 31, wherein the instructions, when executed by the one or more processors, cause the second device to validate the request data by comparing:
    a nonce value indicated in the request data; and
    a database of previously received nonce values.

37. The second device of claim 31, wherein the instructions, when executed by the one or more processors, cause the second device to verify the identity of the first device by:
    sending, to a certificate authority, the certificate data; and
    receiving, from the certificate authority, validated certificate data.

38. The second device of claim 37, wherein the instructions, when executed by the one or more processors, cause the second device to validate the request data by decoding a digital signature based on the validated certificate data.

* * * * *